United States Patent
Harada

(10) Patent No.: US 8,265,397 B2
(45) Date of Patent: Sep. 11, 2012

(54) IMAGE RETRIEVAL APPARATUS AND METHOD THEREOF

(75) Inventor: Takuto Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1089 days.

(21) Appl. No.: 11/942,144

(22) Filed: Nov. 19, 2007

(65) Prior Publication Data

US 2008/0123963 A1 May 29, 2008

(30) Foreign Application Priority Data

Nov. 24, 2006 (JP) ................... 2006-317768

(51) Int. Cl.
*G06K 9/46* (2006.01)
*G06K 1/00* (2006.01)

(52) U.S. Cl. ........................................ 382/190; 382/181
(58) Field of Classification Search .................. 382/181, 382/190; 358/1.1
See application file for complete search history.

(56) References Cited

U.S. PATENT DOCUMENTS

| | | | |
|---|---|---|---|
| 5,931,586 A | 8/1999 | Kashiwazaki et al. | 400/61 |
| 6,385,348 B1 | 5/2002 | Harada | 382/284 |
| 6,625,315 B2 * | 9/2003 | Laumeyer et al. | 382/190 |
| 6,704,449 B1 * | 3/2004 | Ratner | 382/176 |
| 6,816,289 B1 * | 11/2004 | Kim et al. | 358/515 |
| 7,669,127 B2 * | 2/2010 | Hull et al. | 715/716 |
| 2004/0105004 A1 * | 6/2004 | Rui et al. | 348/159 |

FOREIGN PATENT DOCUMENTS

| | | | |
|---|---|---|---|
| JP | 07-079404 A | | 3/1995 |
| JP | 2001-223944 A | | 8/2001 |
| JP | 2004-072504 A | | 3/2004 |
| JP | 2005-236483 | * | 2/2005 |
| JP | 2005-115607 A | | 4/2005 |
| JP | 2005-117330 A | | 4/2005 |
| JP | 2005-236483 | | 9/2005 |
| JP | 2005-339537 A | | 12/2005 |

OTHER PUBLICATIONS

Office Action which issued on Jan. 6, 2012, in counterpart Japanese application No. 2006-317768.

* cited by examiner

*Primary Examiner* — Stephen R Koziol
(74) *Attorney, Agent, or Firm* — Fitzpatrick, Cella, Harper & Scinto

(57) ABSTRACT

An image retrieval method and apparatus for extracting a desired frame as still image data from moving image data is provided, in which when a character search string is input, frames having the character search string are retrieved from moving image data including a plurality of frames, and if retrieved frames having the character search string in an equivalent position are consecutive for a predetermined amount, one of the consecutive frames is extracted as still image data.

11 Claims, 18 Drawing Sheets

IMAGE RETRIEVAL APPARATUS AND METHOD THEREOF

BACKGROUND OF THE INVENTION

1. Field of the Invention

The present invention relates to an image retrieval apparatus for extracting a frame as still image data from a plurality of frames included in moving image data, and a method thereof.

2. Description of the Related Art

In recent years, the spread of digital cameras, digital camcorders, and digital television broadcasts, and the increasing speed of Internet communications have facilitated the handling of moving image content. There are various kinds of moving image content, including scenic shots recorded with a digital camera and informational TV programs.

Consideration has also been given to technology for extracting and using images from moving images as still images. Japanese Patent Laid-Open No. 2005-236483 discloses technology for automatically selecting suitable frames as still images from moving images taken with a digital camera.

Specifically, consecutive frames in a moving image are compared with one another to determine whether the images are similar. If there is at least a prescribed number of consecutive frames that are similar, it is determined that these frames are suitable as still images, and selected frames are printed.

However, while the textual information has more importance than the images in the case of informational TV programs, cooking shows and the like, users are not able to extract frames displaying textual information as still images with the above conventional technology.

That is, in the case of cooking shows, for example, recipes are continuously displayed on the side of the screen for a given period of time, while the content and layout in other parts of the screen changes dynamically as the participants prepare food and the like.

In such cases, these frames will not be determined as suitable for still images when using the above conventional technology, because the whole screen does not remain static for a given period of time. That is, if users want to extract frames showing recipes displayed during a cooking show or various textual information presented during an informational program, they are faced with the hassle of fast-forwarding through the moving images and locating the desired frames themselves.

SUMMARY OF THE INVENTION

It is an object of the present invention to eliminate the above-described problems of the conventional technology.

A feature of the present invention lies in providing technology that enables frames in moving image data that include designated characters to be easily extracted.

According to an aspect of the present invention, there is provided an image retrieval apparatus for extracting a frame of moving image data as still image data, comprising:

a character string input unit configured to input a character string to be retrieved;

a search unit configured to retrieve frames having the character string input by the character string input unit from moving image data including a plurality of frames; and an image extraction unit configured to extract, if frames having the character string in an equivalent position, which are retrieved by the search unit, are consecutive for a predetermined amount, one of the consecutive frames as still image data.

According to an aspect of the present invention, there is provided an image retrieval method for extracting a frame of moving image data as still image data, comprising:

a character string input step of inputting a character string to be retrieved;

a search step of retrieving frames having the character string input in the character string input step from moving image data including a plurality of frames; and an image extraction step of extracting, if frames having the character string in an equivalent position, which are retrieved in the search step, are consecutive for a predetermined amount, one of the consecutive frames as still image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the accompanying drawings. The following embodiments are not intended to limit the claims of the present invention, and not all combinations of features described in the embodiments are essential for the present invention.

First Embodiment

Figure 1:
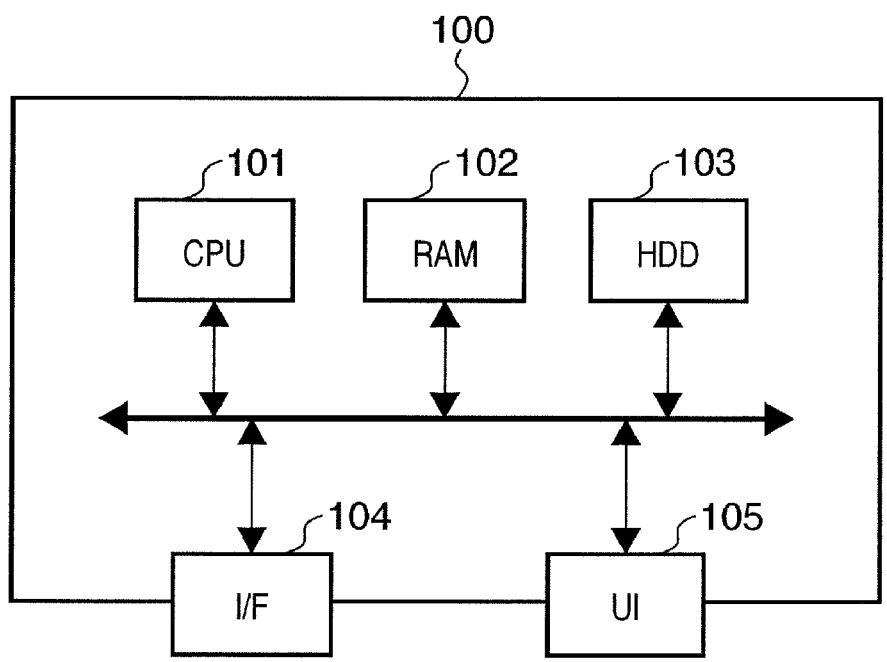
FIG. 1 is a block diagram showing the hardware configuration of an image processing apparatus according to an exemplary embodiment of the present invention.

FIG. 1 is a block diagram showing the hardware configuration of an image processing apparatus according to an exemplary embodiment of the present invention. Note that in the present embodiment described below, the image processing apparatus also functions as an image retrieval apparatus for retrieving and processing images.

Reference numeral 100 denotes an image processing apparatus according to the present embodiment, and this apparatus may, for example, be a personal computer (PC). A CPU 101 executes various processing (described below) by executing computer programs loaded into a RAM 102. The RAM 102 stores programs to be executed under the control of the CPU 101, and provides a work area for storing various data when programs are executed. An HDD 103 is a mass storage apparatus such as a hard drive. An operating system and various application programs are installed on the HDD 103, and when executed these programs are loaded into the RAM 102 and executed by the CPU 101. The HDD 103 also stores image data such as moving images and still images. A communication interface 104 has a wired communication interface such as USB or a wireless communication interface such as Bluetooth. A user interface (UI) 105, which has a display unit and a console unit, displays messages to the user and inputs commands from the user.

Figure 2:
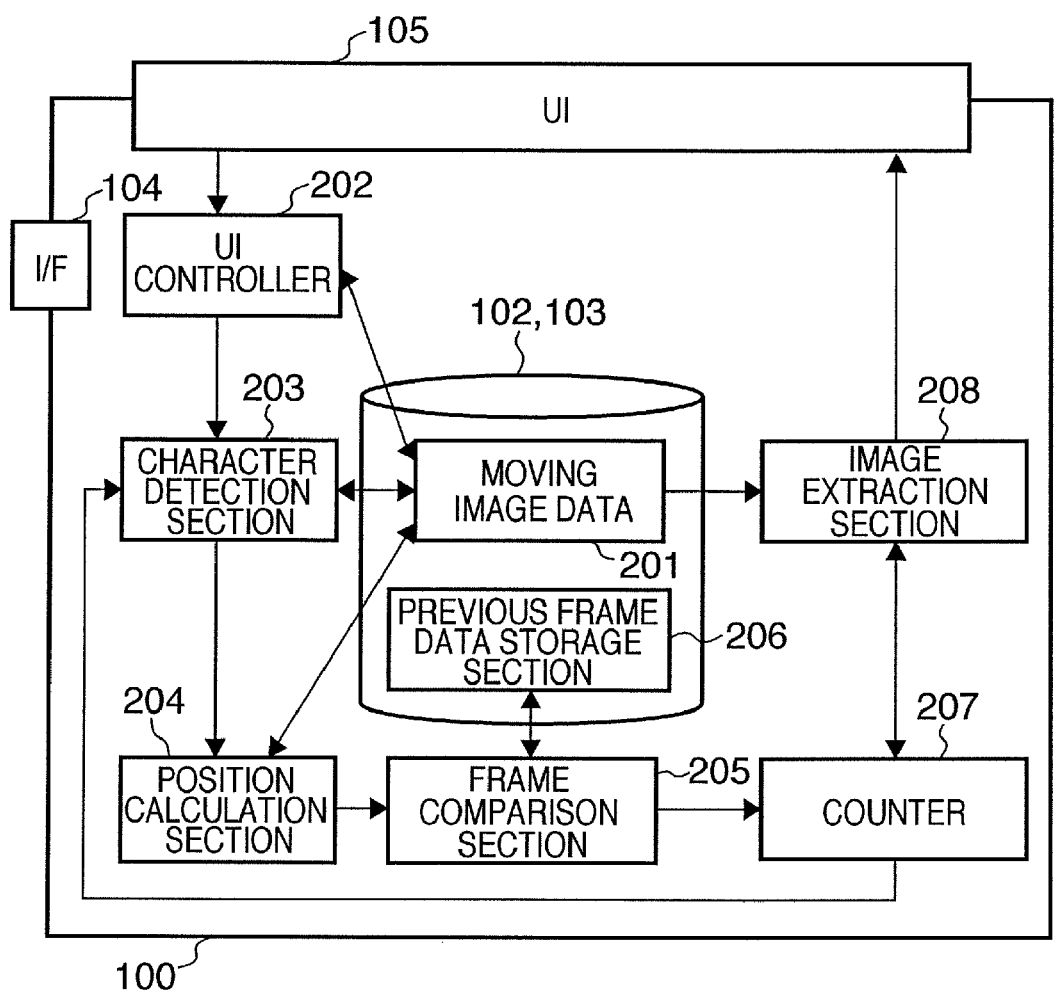
FIG. 2 is a block diagram illustrating the configuration of a software module executed by the image processing apparatus according to the exemplary embodiment.

FIG. 2 is a block diagram illustrating the configuration of a software module executed by the image processing apparatus according to the present embodiment.

Reference numeral 201 denotes moving image data. A UI controller 202 performs controls to display the user interface (UI) shown in FIG. 3 on the UI 105, and thereby enable the user to input characters to be retrieved and moving image data to be searched. A character detection section 203 uses a character recognition function to detect whether characters input from the UI controller 202 are included in frames of the moving image data 201 selected by the UI controller 202. A position calculation section 204 detects the position at which a character string detected by the character detection section 203 is displayed on the screen. A frame comparison section 205 compares the current frame with the previous frame, and determines whether the character string detected by the character detection section 203 exists in the same position in these frames. A previous frame data storage section 206 holds the position information of this character string, if it is determined as a result of the comparison by the frame comparison section 205 that the character string exists in the same position in the previous frame. A counter 207 counts how many frames the detected character string exists in the same position. An image extraction section 208 extracts the frame image from the moving image data 201 as still image data, when the count value of the counter 207 reaches a prescribed value.

Figure 3:
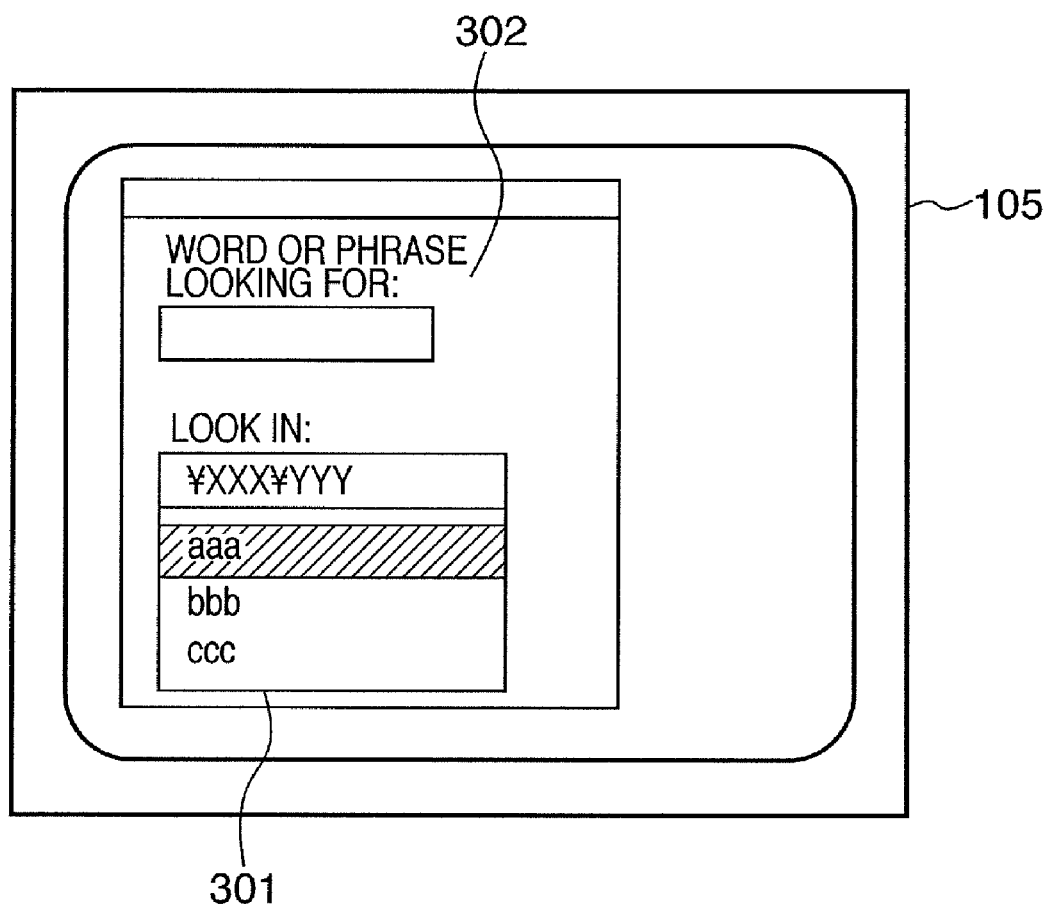
FIG. 3 depicts a view illustrating an exemplary user interface (UI) in the image processing apparatus according to the embodiment.

FIG. 3 depicts a view illustrating an exemplary UI 105 in the image processing apparatus according to the present embodiment.

In FIG. 3, reference numeral 301 denotes a window for selecting moving image files to be searched. Moving image files stored on the HDD 103, for example, are listed in this window 301. Reference number 302 denotes a dialog box for inputting a character string to be retrieved (hereinafter "character search string"). Frames in the moving image file selected from the window 301 that include the character string input in this dialog box 302 are thus retrieved. Note that either one or a plurality of characters (character string) may be input in the dialog box 302, although in the following description, a character string is assumed to be composed of a plurality of characters.

Figure 4:
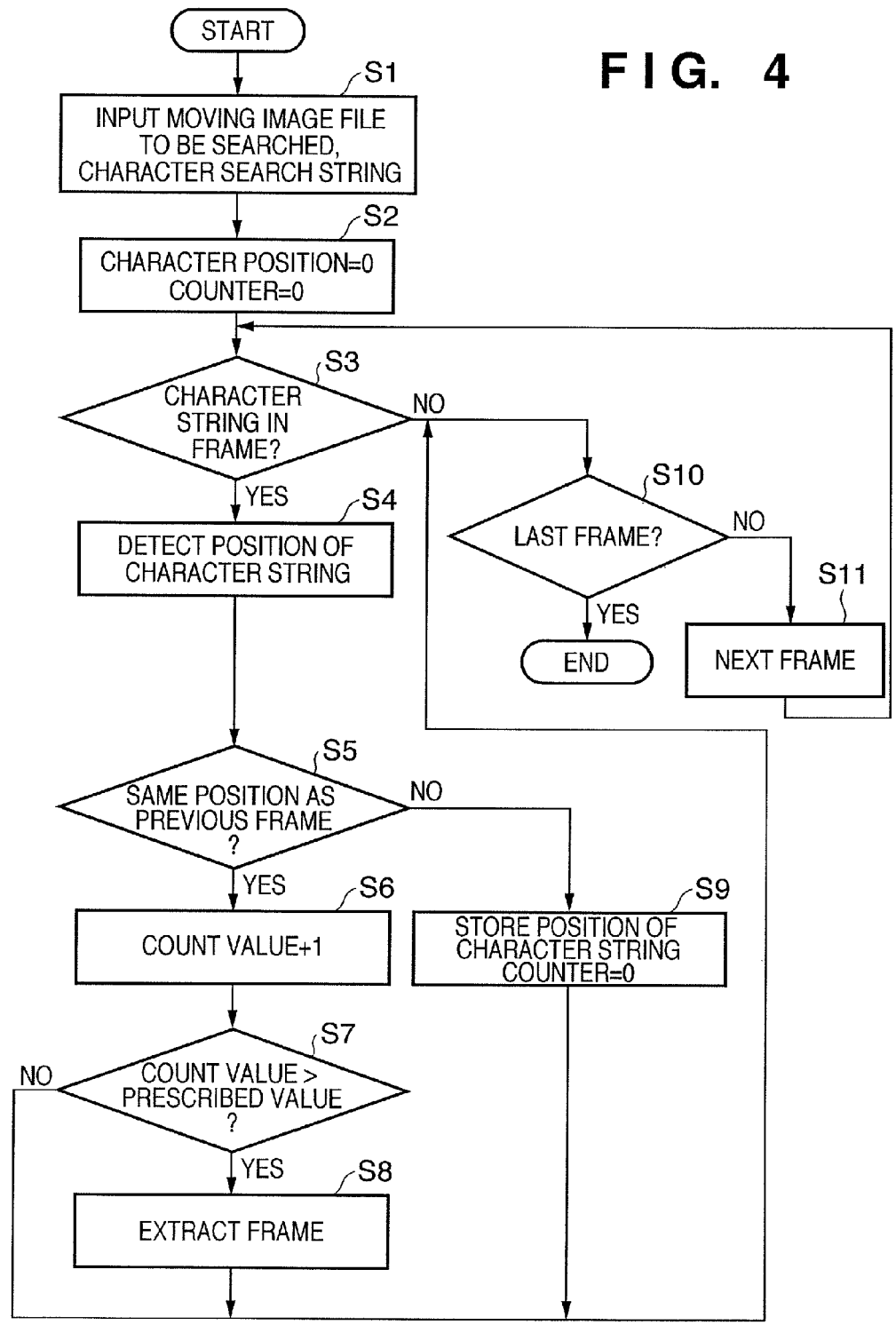
FIG. 4 is a flowchart explaining the process of extracting a frame from a moving image file in the image processing apparatus according to a first embodiment.

FIG. 4 is a flowchart explaining the process of extracting a frame from a moving image file in the image processing apparatus according to the first embodiment. Note that the program for executing this processing is stored in the RAM 102 when executed, and executed under the control of the CPU 101.

Firstly in step S1, when a moving image file to be searched and a character search string have been input by the user using the UI 105 shown in FIG. 3, the processing proceeds to step S2. In step S2, the counter 207 and a storage area of the RAM 102 for storing the position information of character strings found in frames are initialized to "0". Next the processing proceeds to step S3, where it is determined whether the character string designated in step S1 exists in the first frame of the selected moving image file. If it is determined to exist, the processing proceeds to step S4, where the position of the character string is detected and position information showing the position of the retrieved character string is stored. Next the processing proceeds to step S5, where it is determined whether the position of the detected character string coincides with the position information of the previously detected frame. In the case of the first frame, the determined result will be negative since the position information of a previous frame is not stored, and the processing proceeds to step S9. In step S9, the position information detected in step S4 is stored in the storage area of the RAM 102, and the counter 207 is initialized to "0", before proceeding to step S10. Then in step S10, it is determined whether the processed frame is the final frame. If it is the final frame, the processing is ended, whereas if it is not the final frame, the processing proceeds to step S11, where the next frame is retrieved, before proceeding to step S3.

On the other hand, if the same character string is detected in the same position as the previous frame in step S5, the processing proceeds to step S6, where the count value of the counter 207 is incremented by "1". Next the processing proceeds to step S7, where it is determined whether the count value of the counter 11. 207 is a prescribed value or more. If it is the prescribed value or more, the processing proceeds to step S8, where the frame is extracted, before proceeding to step S10. The frame image thus extracted is stored in the RAM 102. This frame image is then used later in a printing process or the like, for example.

Note that in the first embodiment, in the case of a frame image being extracted in step S8, the processing returns to step S3 to retrieve the next frame if the extracted frame was not the last frame, although processing may be ended at the point at which a frame image is successfully extracted. In the case where the designated character string is included in a plurality of frames, all of these frames may be stored or printed. Alternatively, the plurality of frames including the designated character string may be displayed on the UI 105, and the user may be allowed to select a frame for printing from the retrieved plurality of frames.

According to the first embodiment as described above, it is possible in the case where a designated character string appears in the same position successively in at least a predetermined number of frames, to extract one of those frames.

Second Embodiment

In the first embodiment, when the number of frames (time period) in which the same character string appears successively in the same place on the screen reaches a prescribed number (time period) or more, these frames are extracted. However, a configuration in which the user is able to arbitrarily set the number of frames (or time period) is also possible.

Figure 5:
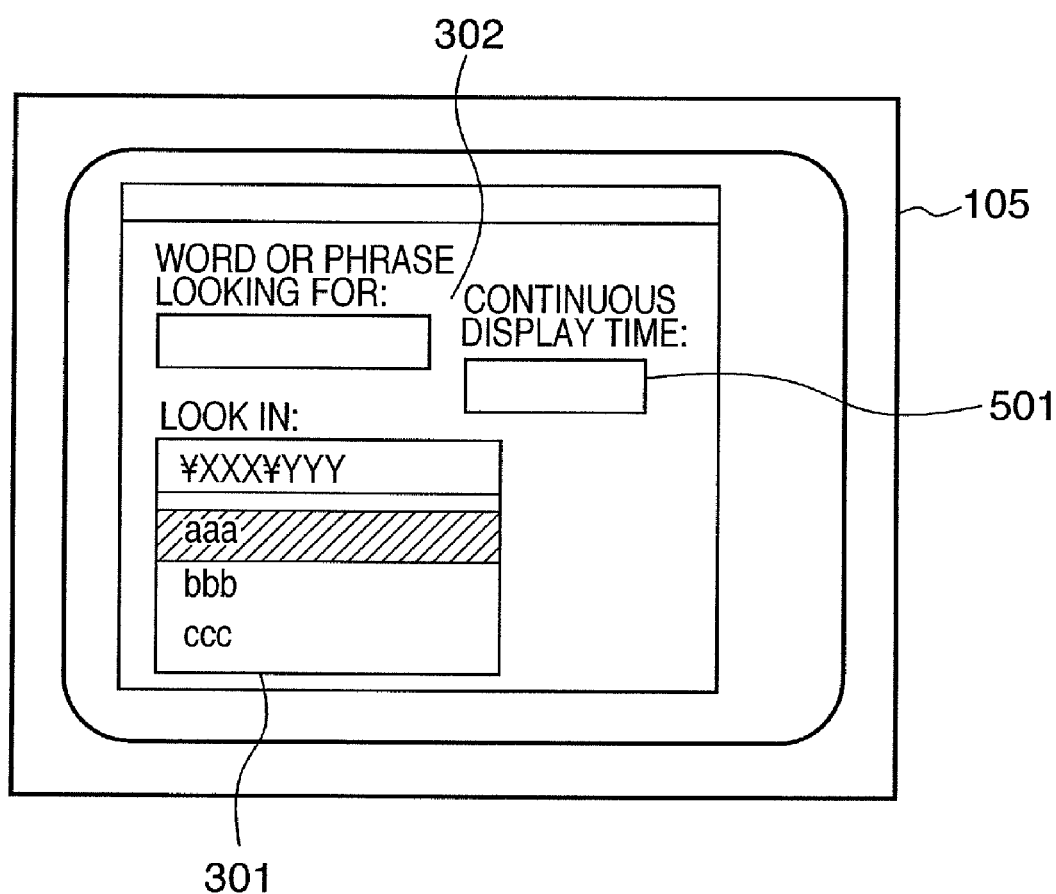
FIG. 5 depicts a view illustrating an exemplary UI of the image processing apparatus according to a second embodiment of the present invention.

FIG. 5 depicts a view illustrating an exemplary UI 105 of the image processing apparatus according to the second embodiment of the present invention. Portions which are common with FIG. 2 are shown with the same reference numerals, and description thereof will be omitted.

This second embodiment includes a time designation dialog box 501 for designating the time period for deciding on frames to be extracted. Note that this time period can also be converted to an equivalent number of frames.

Figure 6:
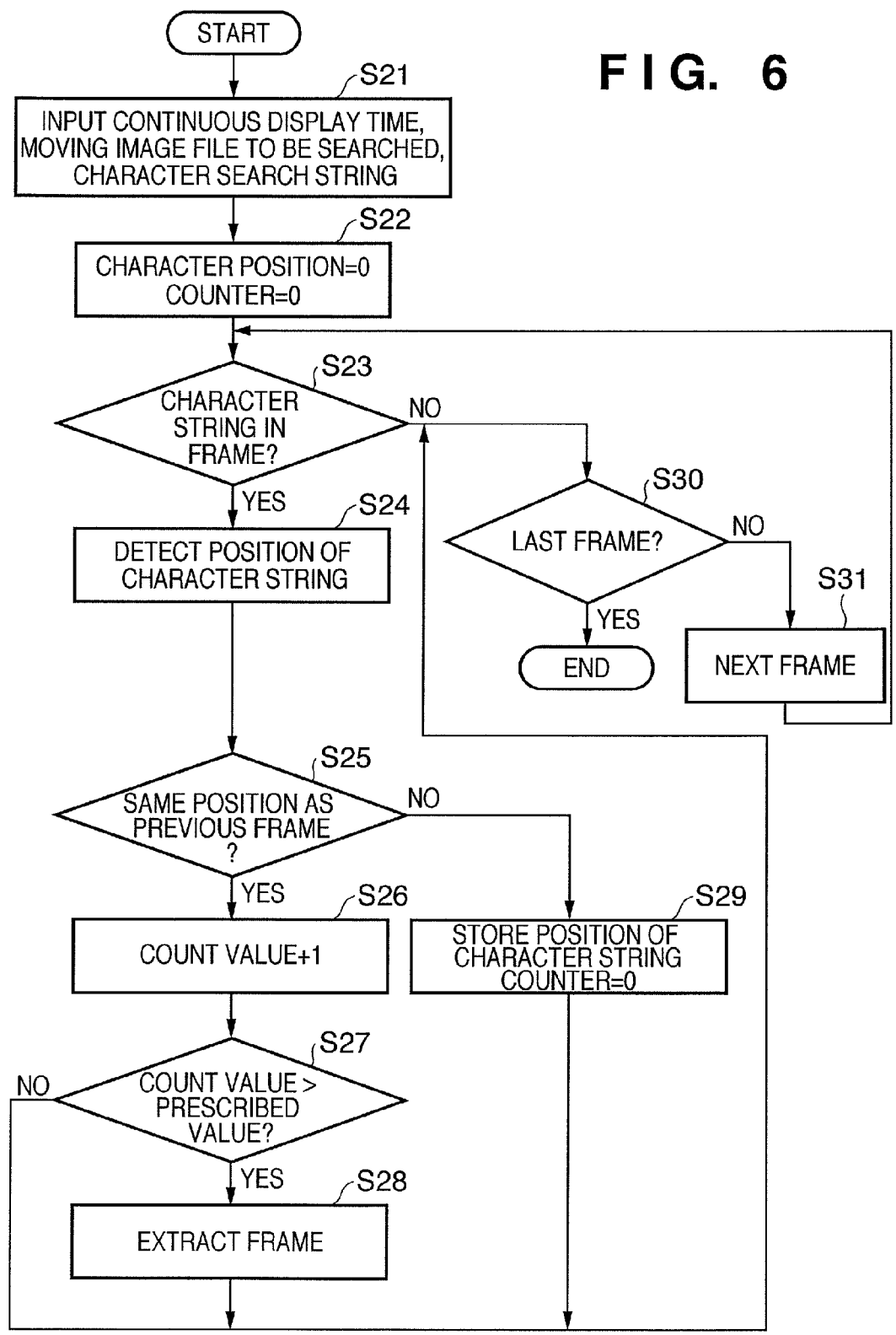
FIG. 6 is a flowchart explaining the process of extracting a frame from a moving image file in the image processing apparatus according the second embodiment.

FIG. 6 is a flowchart explaining the process of extracting a frame from a moving image file in the image processing apparatus according the second embodiment. Note that the program for executing this processing is stored in the RAM 102 when executed, and executed under the control of the CPU 101. Also, since steps S22 to S26 and S28 to S31 in the flowchart of FIG. 6 are the same as steps S2 to S6 and S8 to S11 in FIG. 4, description thereof will be omitted.

Here, firstly in step S21, the user uses the dialog box 501 in FIG. 5 to input a time period for searching for the character search string, selects a moving image file to be searched for the character search string, and inputs the character search string. Then in step S27, it is determined whether the count value of the counter 207 is greater than or equal to the time period designated in step S21. If the time period designated by the user has elapsed, the processing proceeds to step S28, where the frame is extracted and stored in the RAM 102.

According to the second embodiment as described above, frames can be extracted by designating a time period for which the designated character string is required to appear successively in the same position of frames.

Third Embodiment

In the first and second embodiments, the entire frame is searched for the character string, although with certain informational programs, for example, retail information tends to always be displayed in the bottom right quarter of the screen. The processing time required for character recognition can be decreased by making use of this tendency and limiting the area within frames in which the presence of the character string is detected.

Figure 7:
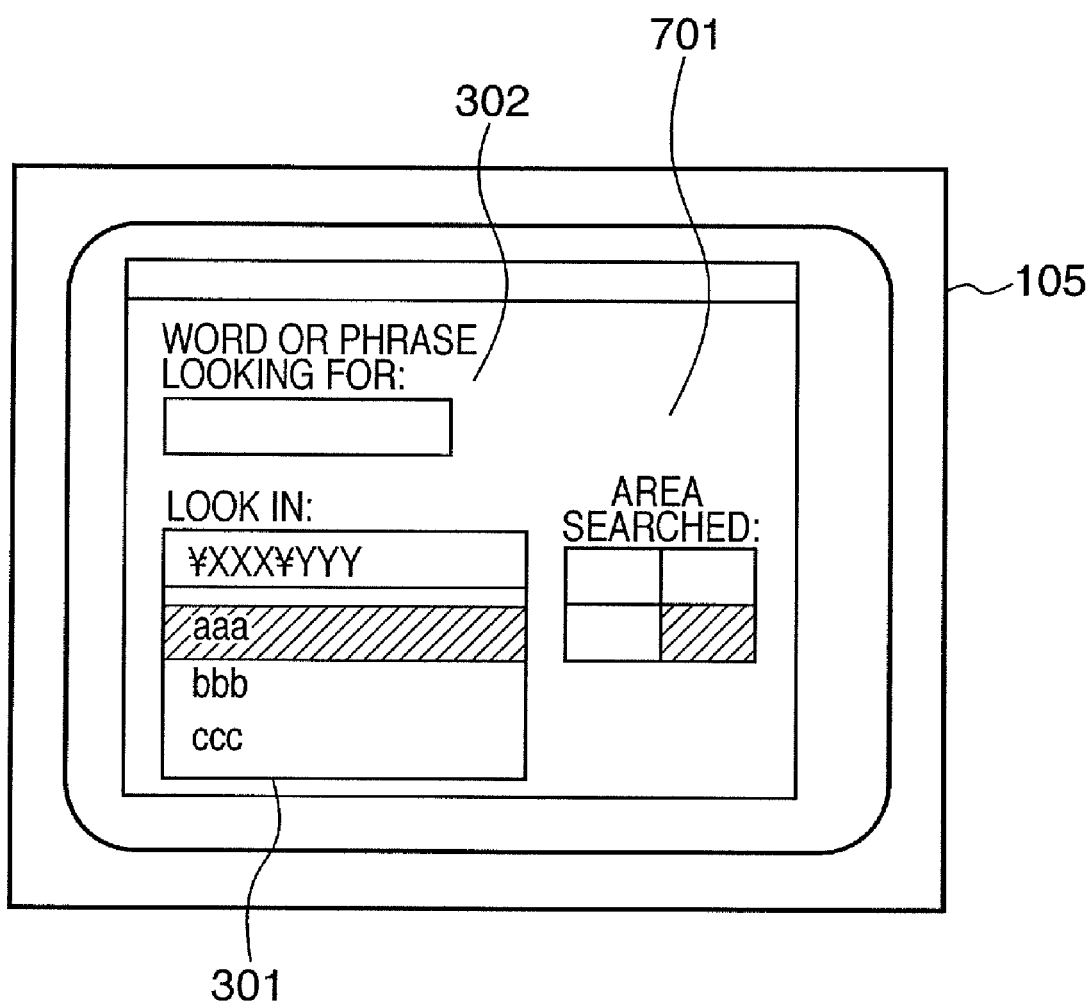
FIG. 7 depicts a view illustrating an exemplary UI of the image processing apparatus according to a third embodiment of the present invention.

FIG. 7 depicts a view illustrating an exemplary UI 105 of the image processing apparatus according to the third embodiment of the present invention. Portions which are common with FIG. 2 are shown with the same reference numerals, and description thereof will be omitted.

With this UI 105, an area 701 designating an image extraction area is provided in addition to the configuration (FIG. 3) of the first embodiment. In the FIG. 7 example, the frames are divided in four, and the bottom right half of the quartered screen is designated.

Figure 8:
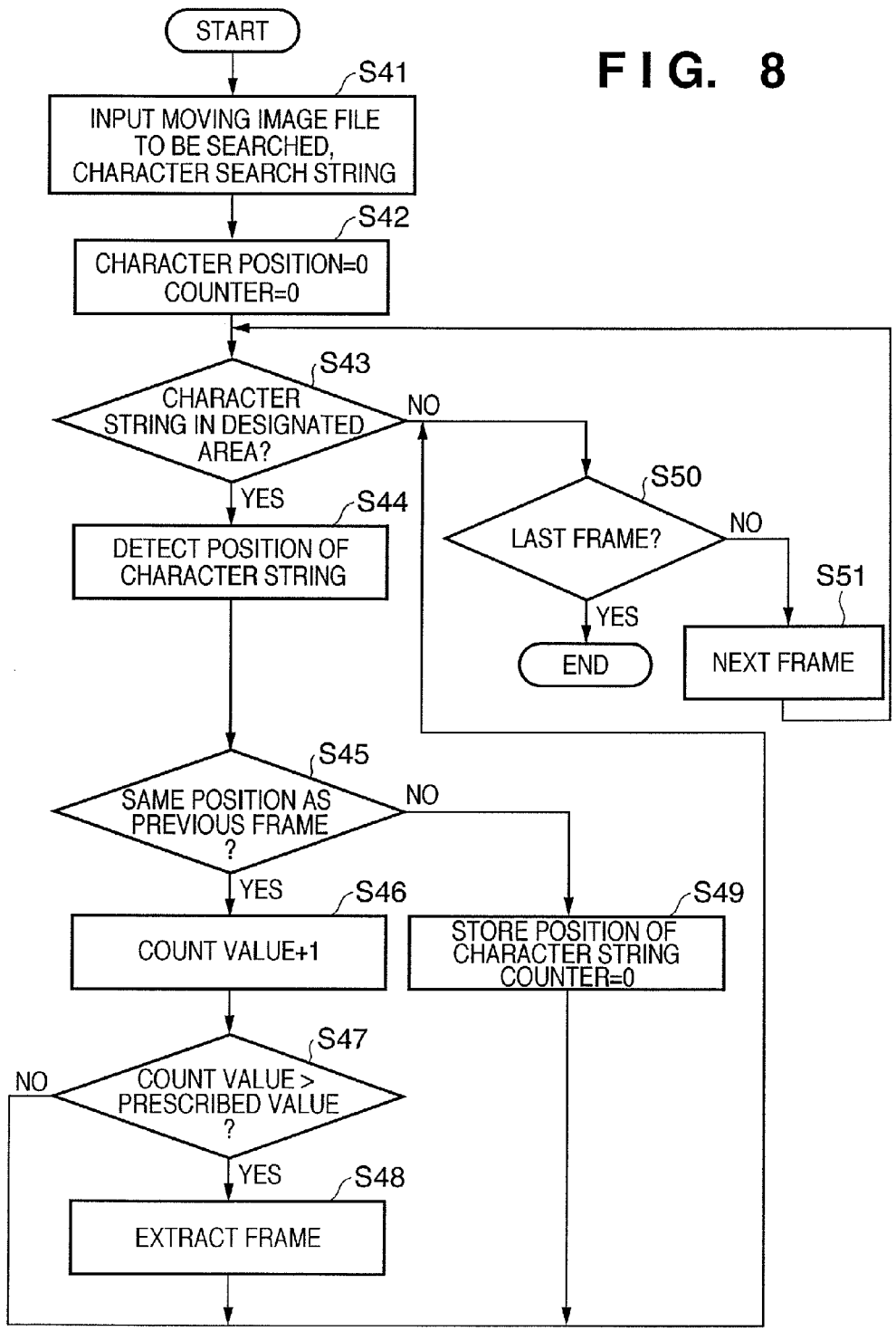
FIG. 8 is a flowchart explaining the process of extracting a frame from a moving image file in the image processing apparatus according to the third embodiment.

FIG. 8 is a flowchart explaining the process of extracting a frame from a moving image file in the image processing apparatus according to the third embodiment. Note that the program for executing this processing is stored in the RAM 102 when executed, and executed under the control of the CPU 101. Also, since steps S41 to S42 and S44 to S51 in the flowchart of FIG. 8 are the same as steps S1 to S2 and S4 to S11 in FIG. 4, description thereof will be omitted.

In the third embodiment, it is determined in step S43 whether the character search string input in step S41 exists in the area designated in the area designation dialog box 701 of FIG. 7. If the designated character string exists in the designated area, the processing proceeds to step S44, where the position of the character string is detected, before checking in step S45 whether the position is the same. The remaining processing is the same as the first embodiment described above.

According to the third embodiment as described above, the processing time required to determine whether a character string is included can be decreased, in addition to achieving the effects of the first and second embodiments.

Fourth Embodiment

In the first to third embodiments, frames in which the same character string appears successively in the same position for a given time period or for a time period designated by the user are extracted. However, a configuration in which one or more arbitrary frames of a moving image that are displayed within this time period are extracted is also possible.

Here, for example, the first frame could be extracted, or consecutive frames within the time period could be evenly divided and the user made to select a frame he or she wants printed.

Figure 9:
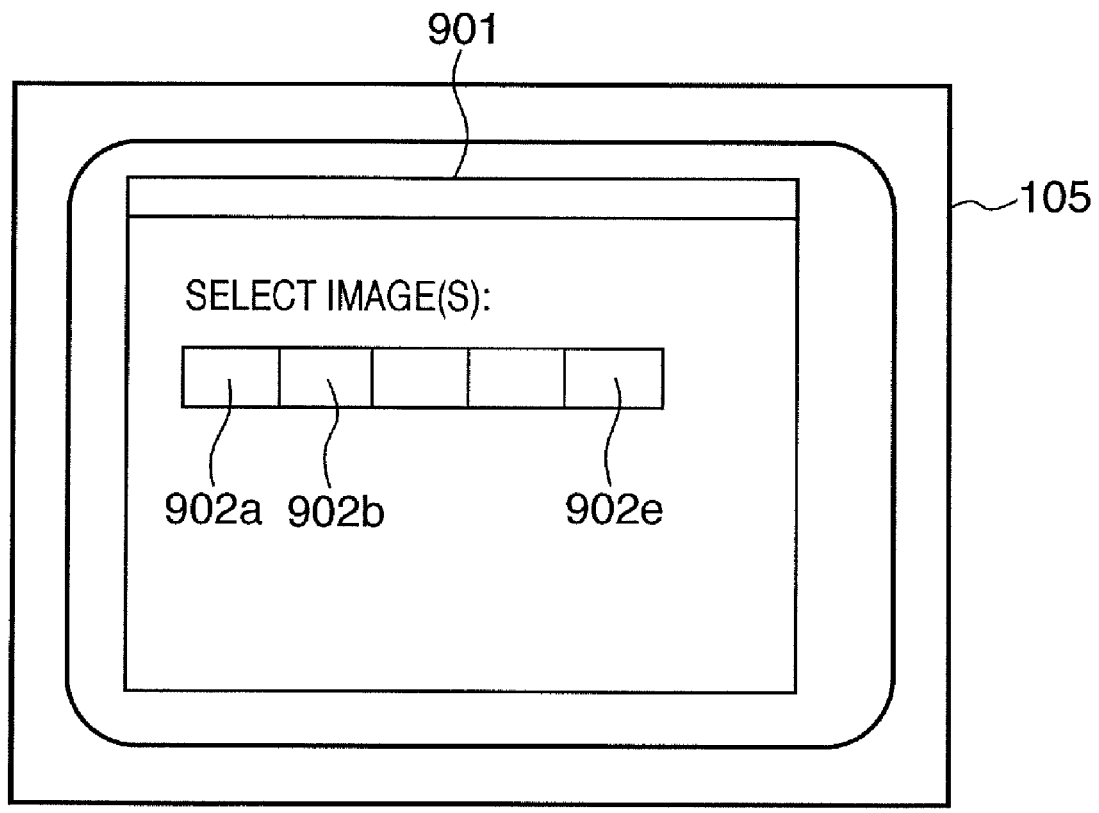
FIG. 9 depicts a view illustrating an exemplary US of the image processing apparatus according to a fourth embodiment of the present invention.

FIG. 9 depicts a view illustrating an exemplary UI 105 of the image processing apparatus according to the fourth embodiment of the present invention.

Here, the function of displaying a window 901 for designating frames to be extracted is added.

In the FIG. 9 example, boxes 902a to 902e for designating extraction candidate frames are displayed. Here, each box may correspond to one of the consecutive frames, or to a representative frame (e.g., the first frame) of blocks obtained by evenly dividing consecutive frames within the time period, as described above.

Figure 10:
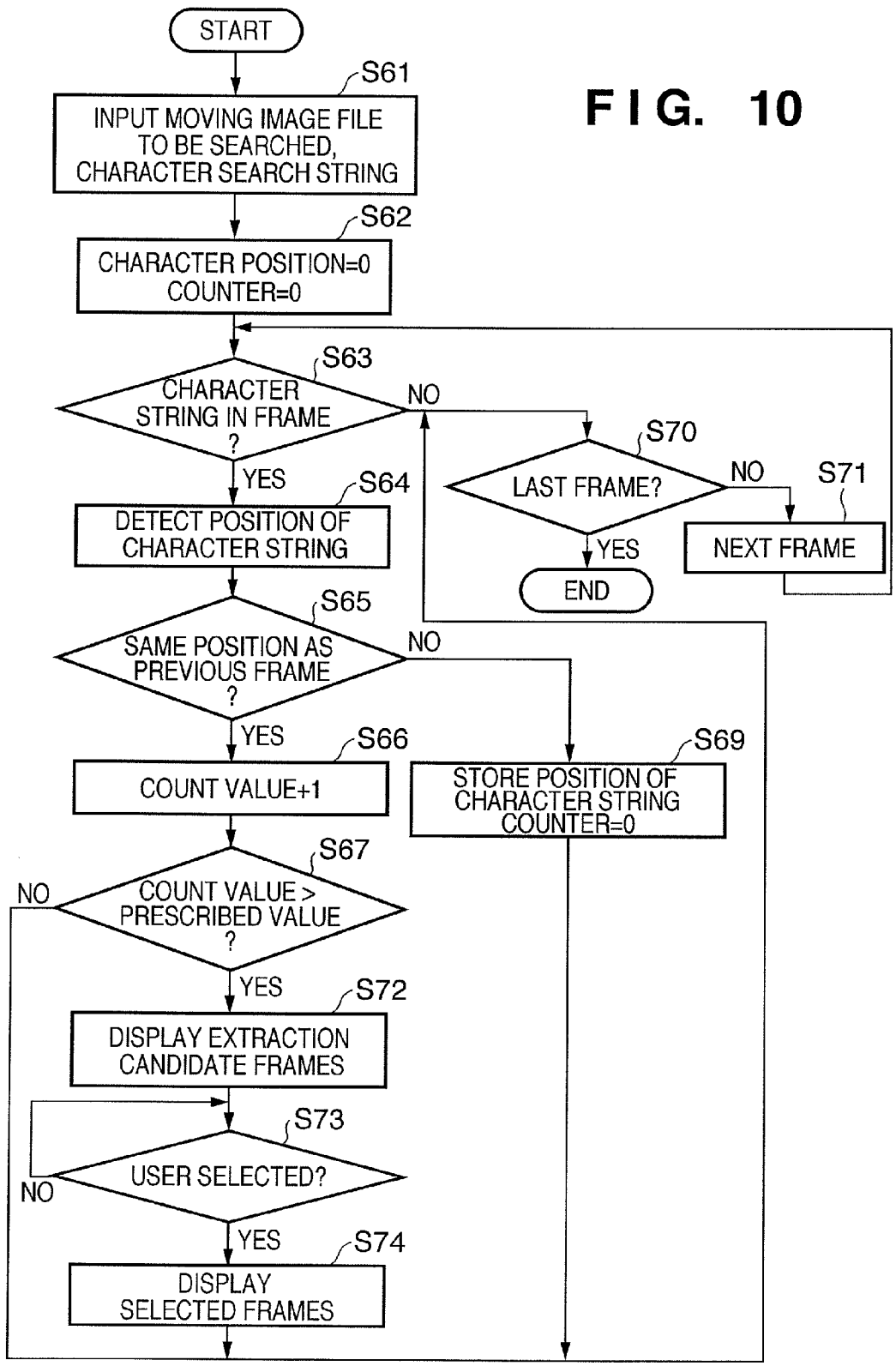
FIG. 10 is a flowchart explaining the process of extracting a frame from a moving image file in the image processing apparatus according to the fourth embodiment.

FIG. 10 is a flowchart explaining the process of extracting a frame from a moving image file in the image processing apparatus according to the fourth embodiment. Note that the program for executing this processing is stored in the RAM 102 when executed, and executed under the control of the CPU 101. Also, since steps S61 to S67 and S69 to S71 in the flowchart of FIG. 10 are the same as steps S1 to S7 and S9 to S11 in FIG. 4, description thereof will be omitted.

Here in step S67, when the count value surpasses a set value, the processing proceeds to step S72, where a screen (FIG. 9) is displayed for the user to select a frame he or she wants to extract from the plurality of frames within this time period. Next in step S73, when the user has selected a desired box on the displayed screen, the processing proceeds to step S74, where the frame corresponding to the selected box is displayed as a frame to be extracted, and stored in the RAM 102.

According to the fourth embodiment as described above, the user is able to select a frame that he or she wants to display or print from a plurality of consecutive frames, in the case where there are consecutive frames having the character search string, in addition to achieving the effects of the first and second embodiments.

Note that the second to fourth embodiments may be implemented individually or appropriately combined (e.g., second with third embodiment).

Fifth Embodiment

In the first to fourth embodiments, the image processing apparatus is an information processing apparatus such as a PC. In this fifth embodiment, the image processing apparatus can also be applied to a printing apparatus. In this case, extracted frames are for printing.

Figure 11:
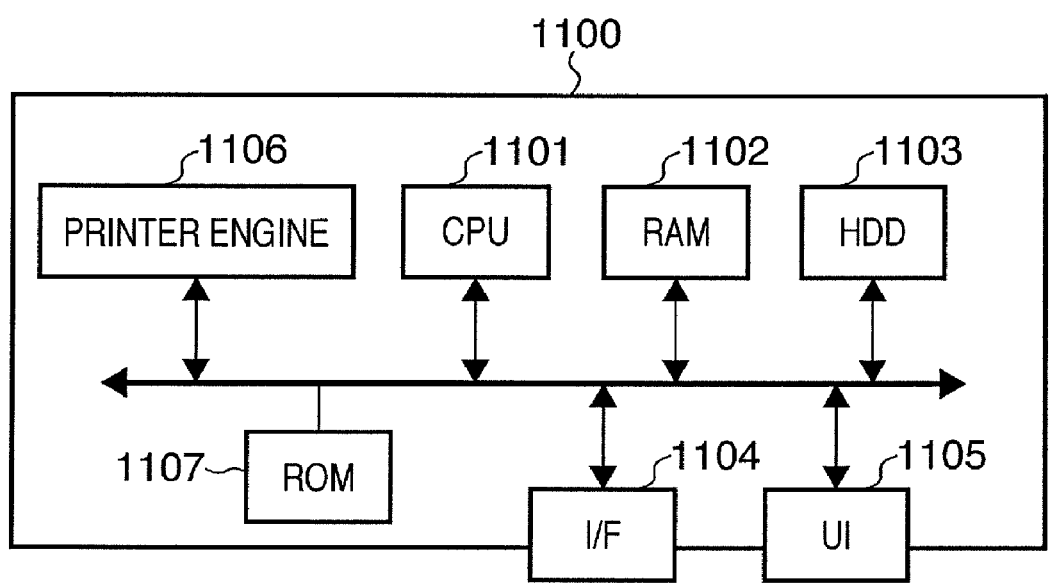
FIG. 11 is a block diagram showing the hardware configuration of a printing apparatus, which an exemplary image processing apparatus according to a fifth embodiment of the present invention.

FIG. 11 is a block diagram showing the hardware configuration of a printing apparatus, which is an exemplary image processing apparatus according to the fifth embodiment of the present invention.

The reference numeral 1100 denotes a printing apparatus according to this embodiment. A CPU 1101 executes various processing (described below) by executing computer programs stored in a ROM 1107. A RAM 1102 provides a work area for storing various data when controls are performed by the CPU 1101. An HDD 1103 is a mass storage apparatus such as a hard drive that is used to store print data and the like received from an external apparatus. A communication interface 1104 has a wired communication interface such as USB or a wireless communication interface such as Bluetooth. A user interface (UI) 1105, which has a display unit and a console unit, displays messages to the user and inputs commands from the user. Reference numeral 1106 denotes a printer engine employing an electrophotographic method or an inkjet method, for example.

Figure 12:
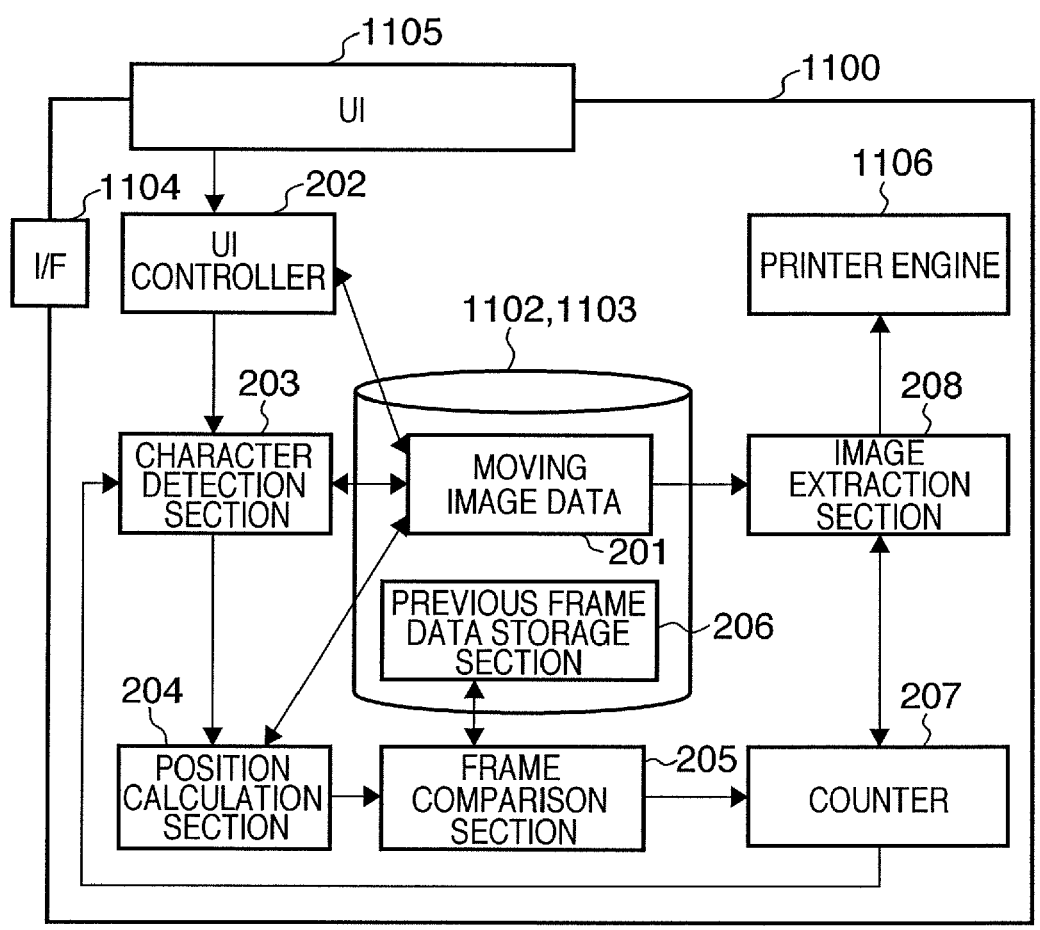
FIG. 12 is a block diagram illustrating the configuration of a software module executed by the printing apparatus according to the fifth embodiment.

FIG. 12 is a block diagram illustrating the configuration of a software module executed by the printing apparatus 1100 according to the fifth embodiment. Note that portions which are common with FIG. 2 are shown with the same reference numerals, and description thereof will be omitted.

Here, a difference with FIG. 2 lies in the fact that frames extracted by the image extraction section 208 are output to the printer engine 1106 and printed.

Figure 13:
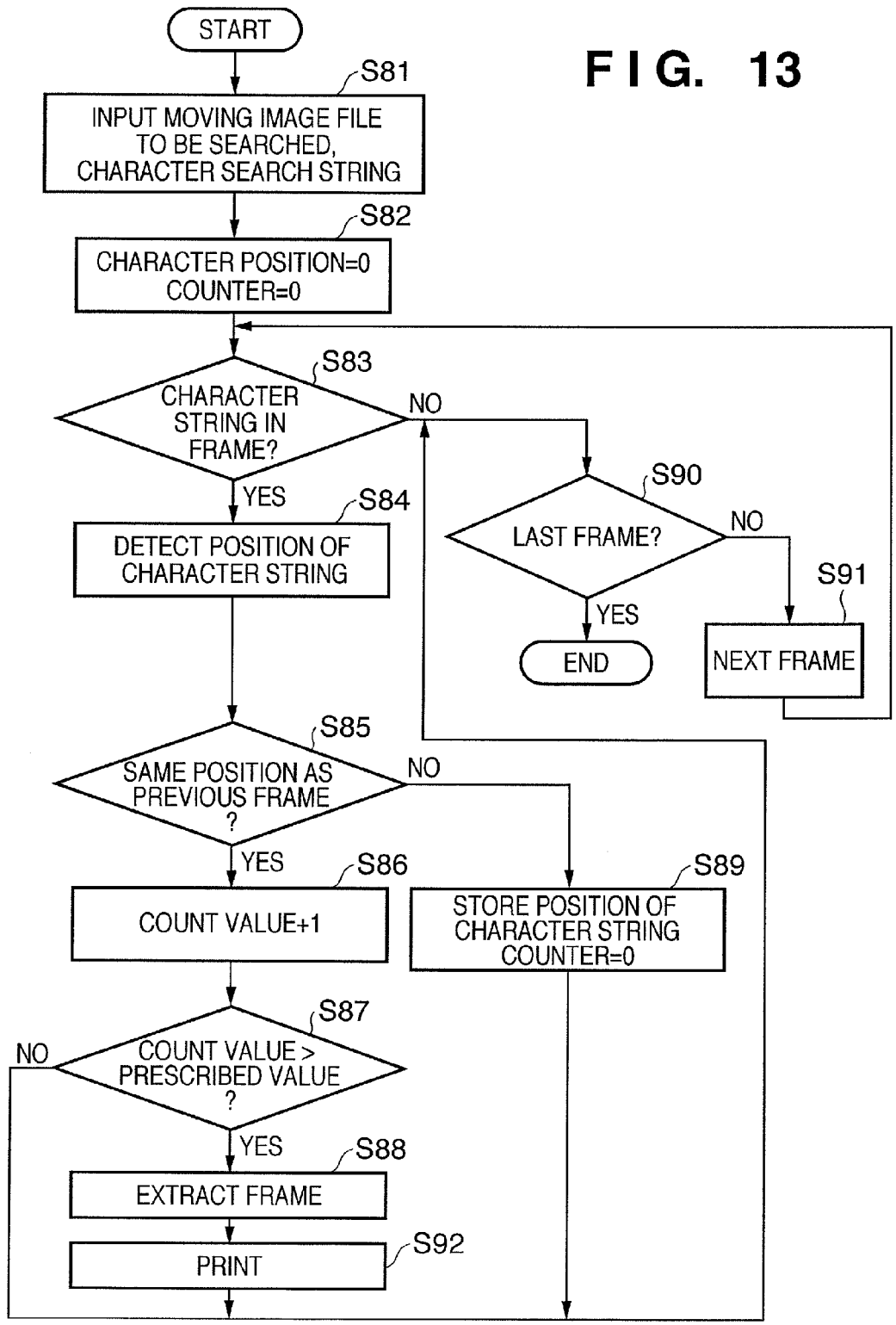
FIG. 13 is a flowchart explaining the process of extracting a frame from a moving image file in the image processing apparatus according to the fifth embodiment.

FIG. 13 is a flowchart explaining the process of extracting a frame from a moving image file in the image processing apparatus according to the fifth embodiment. Note that the program for executing this processing is stored in the RAM 1102 when executed, and executed under the control of the CPU 1101. Also, since steps S81 to S91 in the flowchart of FIG. 13 are the same as steps S1 to S11 in FIG. 4, description thereof will be omitted.

In this flowchart, a frame to be printed is extracted in step S88, and then in step S92, the extracted frame is output to the printer engine 1106 and printed.

According to the fifth embodiment as described above, a frame can be extracted and printed in the case where a designated character string appears successively in the same position, similarly to the first embodiment.

Sixth Embodiment

In the fifth embodiment, the moving image data 201 is stored in the printing apparatus 1100, but a configuration in which a printing apparatus is connected to a PC (image processing apparatus), and moving image files and character search strings are instructed from the PC is also possible, similarly to a normal printing operation.

Figure 14:
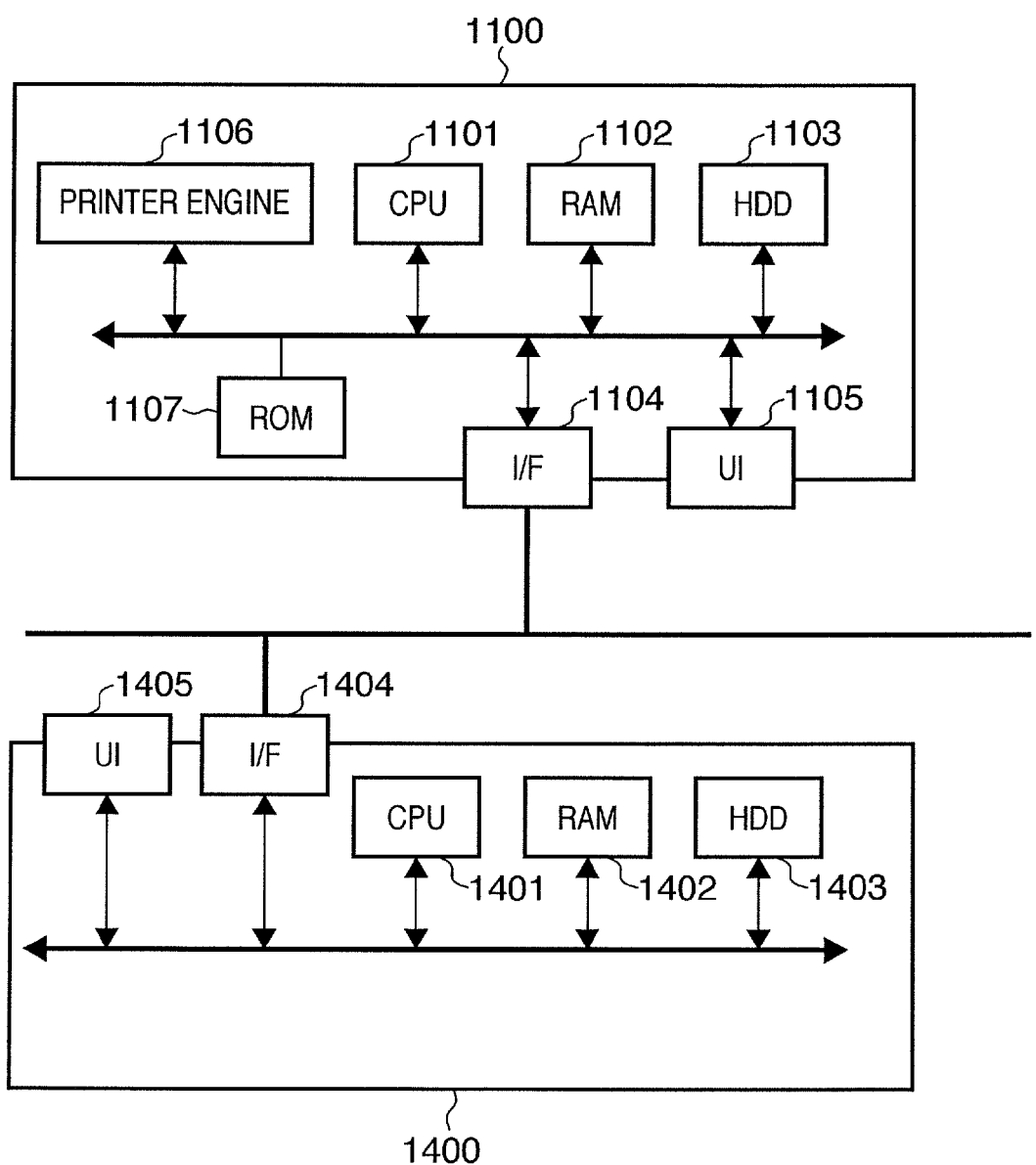
FIG. 14 is a block diagram showing the hardware configuration of a printing system according to a sixth embodiment of the present invention.

FIG. 14 is a block diagram showing the hardware configuration of a printing system according to the sixth embodiment of the present invention. Note that since the configuration of the printing apparatus 1100 is similar to FIG. 11, description thereof will be omitted.

Reference numeral 1400 denotes a personal computer (PC) according to the sixth embodiment. CPU 1401 executes various processing (described below) by executing computer programs loaded into a RAM 1402. The RAM 1402 stores programs to be executed under the control of the CPU 1401, and provides a work area for storing various data when programs are executed. An HDD 1403 is a mass storage apparatus such as a hard drive. An operating system and various application programs are installed on the HDD 1403, and when executed these programs are loaded into the RAM 1402 and executed by the CPU 1401. The HDD 1403 also stores image data such as moving images and still images. A communication interface 1404 has a wired communication interface such as USB or a wireless communication interface such as Bluetooth. A user interface (UI) 1405, which has a display unit and a console unit, displays messages to the user and inputs commands from the user.

Figure 15:
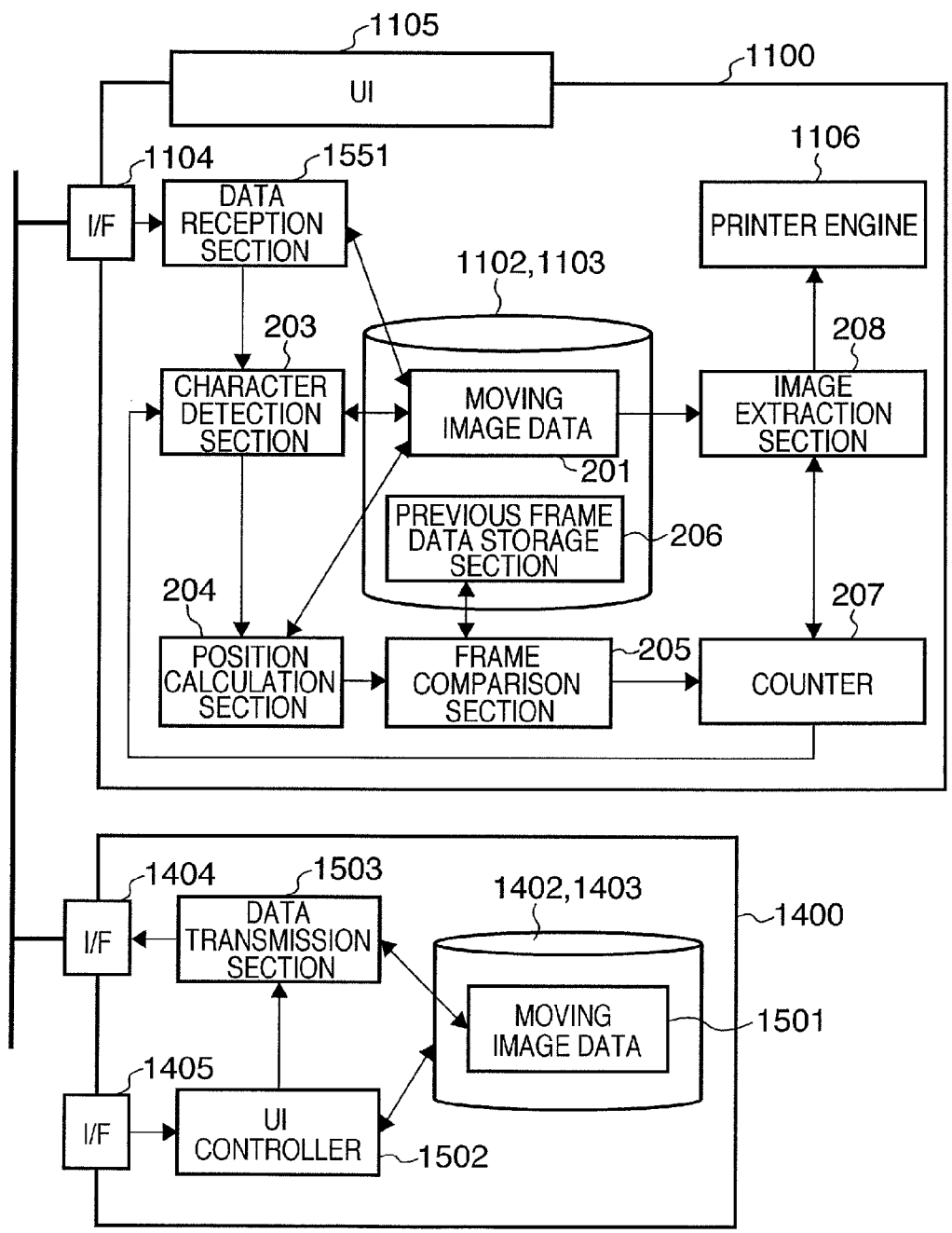
FIG. 15 is a block diagram showing the configuration of a software manual according to the sixth embodiment of the present invention.

FIG. 15 is a block diagram illustrating the configuration of a software module according to the sixth embodiment.

Reference numeral 1501 in the PC 1400 denotes moving image data. Reference numeral 1502 denotes a UI controller for displaying the UI 1405 shown in FIG. 16, and allowing the user to select character strings to be retrieved and moving image files to be searched. A data transmission section 1503 transmits moving image data and character search strings input under the control of the UI controller 1502 to the printing apparatus 1100 via the communication interface 1404.

Here, the configuration of the software module in the printing apparatus 1100 is the same as FIG. 12, except for a data reception section 1551 for receiving data from the PC 1400. The data reception section 1551 receives moving image files and character strings transmitted from the PC 1400 via the communication interface IF 1104. Moving image files thus received are stored in the HDD 1103 or the RAM 1102 of the printing apparatus 1100 as the moving image data 201. Character search strings are sent to the character detection section 203.

Figure 16:
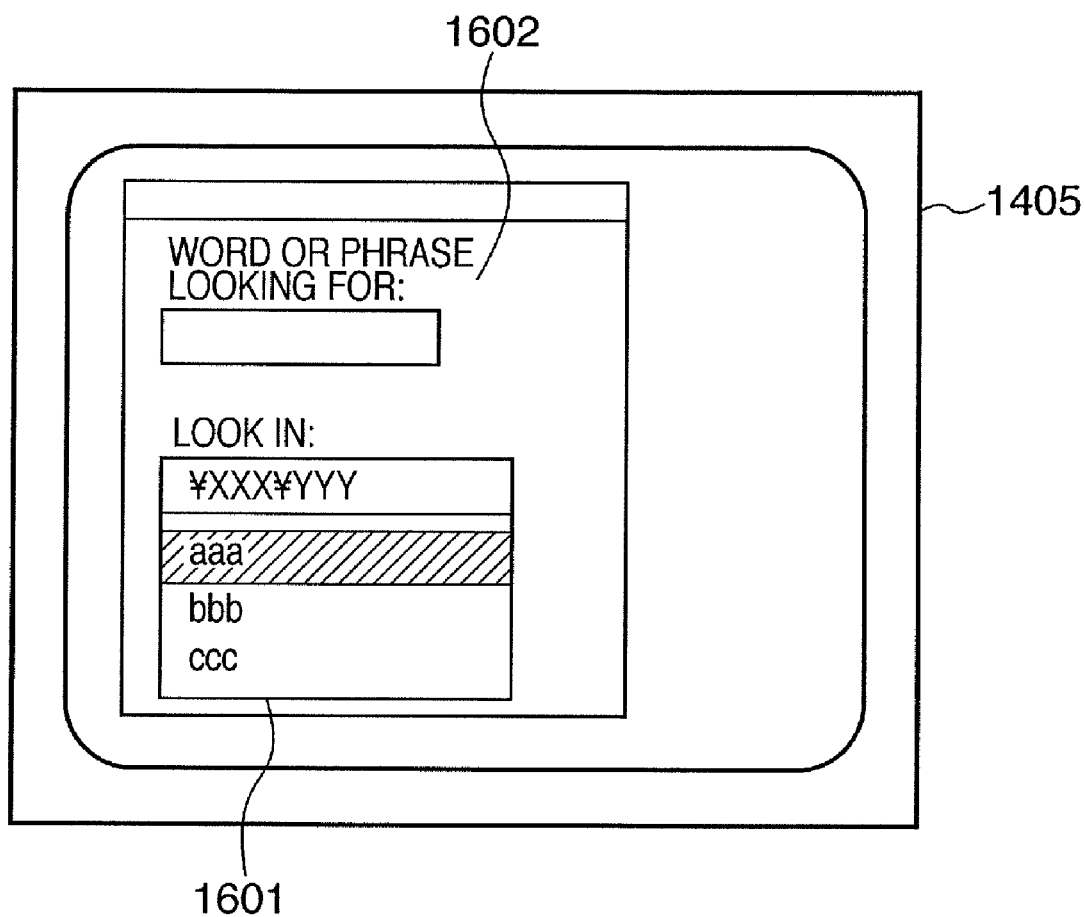
FIG. 16 depicts a view illustrating an exemplary user interface (UI) in the image processing apparatus according to the sixth embodiment.

FIG. 16 depicts a view illustrating an exemplary user interface (UI) in the image processing apparatus according to the sixth embodiment.

In FIG. 16, reference numeral 1601 denotes a window for selecting moving image files to be searched. Moving image files stored on the HDD 1403, for example, are listed in this window 1601. Reference numeral 1602 denotes a dialog box for inputting character search strings. Frames in the moving image file selected from the window 1601 that include the character string input in this dialog box 1602 are thus retrieved.

Figure 17:
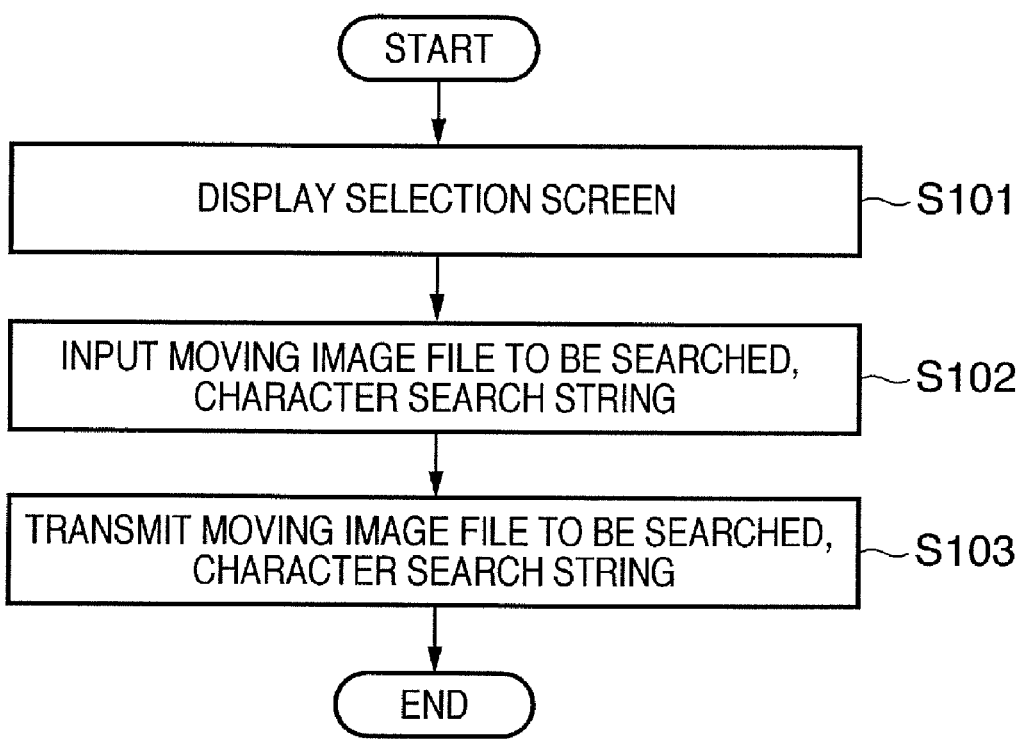
FIG. 17 is a flowchart explaining processing by a PC according to the sixth embodiment of the present invention.

FIG. 17 is a flowchart explaining the processing of the PC 1400 according to the sixth embodiment. The program for executing this processing is stored in the RAM 1402 when executed, and executed under the control of the CPU 1401.

Firstly in step S101, an IU screen such as shown in FIG. 16 is displayed on the UI 1405. Next the processing proceeds to step S102, where the screen shown in FIG. 16 is used to designate a moving image file to be searched and a character search string. Next the processing proceeds to step S103, where the moving image file designated in step S102 is acquired, and transmitted to the printing apparatus 1100 together with the character search string similarly input in step S102.

Figure 18:
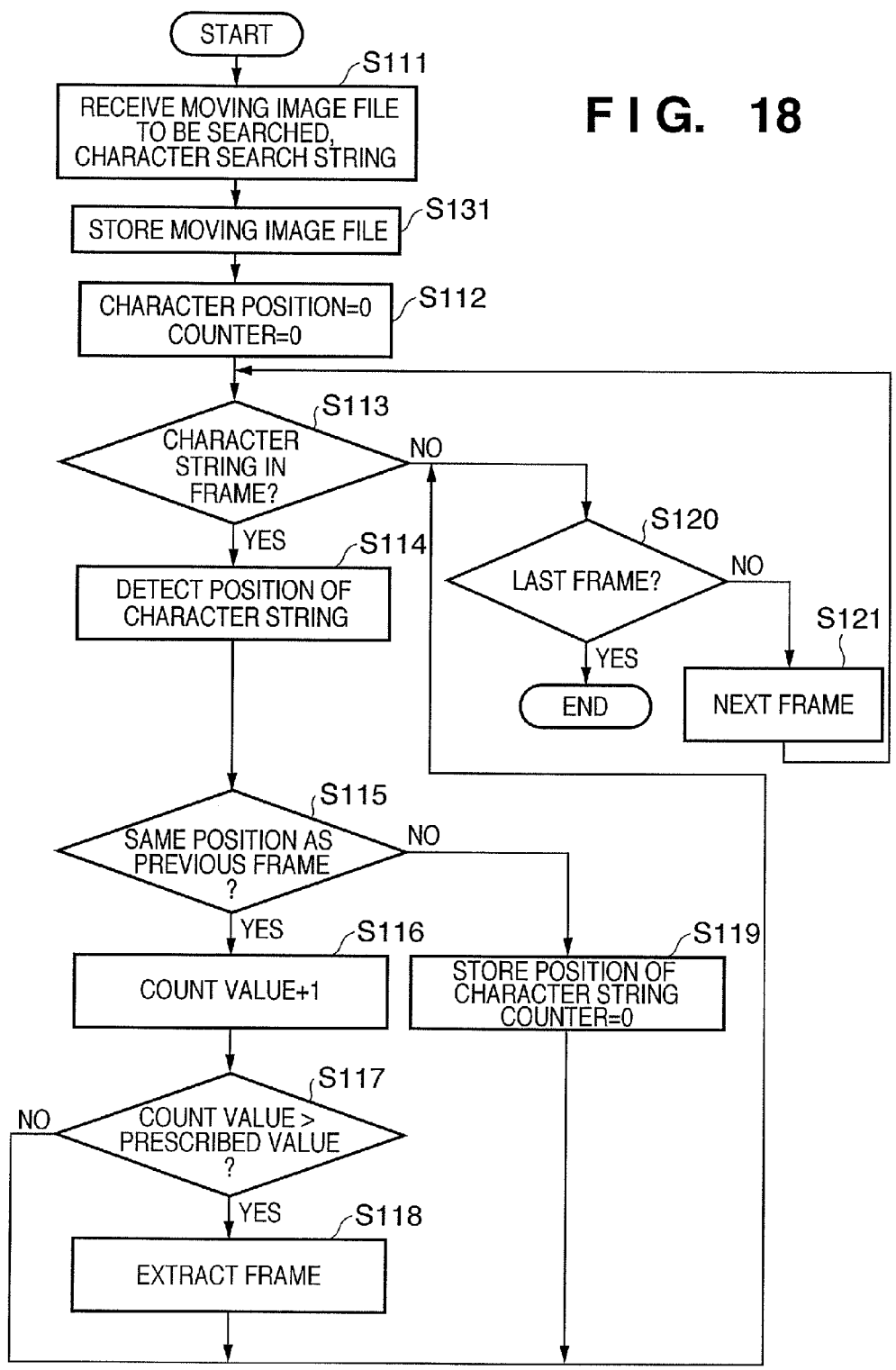
FIG. 18 is a flowchart explaining the process of receiving a moving image file and a character search string from a PC and extracting a frame in a printing apparatus according to the sixth embodiment.

FIG. 18 is a flowchart explaining the process of extracting a frame from a moving image file in the printing apparatus 1100 according to the sixth embodiment. Note that the program for executing this processing is stored in the ROM 1107, and executed under the control of the CPU 1101. Also, since steps S112 to S121 in the flowchart of FIG. 18 are the same as steps S2 to S11 in FIG. 4, description thereof will be omitted.

Firstly, in step S111, a character search string and a moving image file to be searched are received from the PC 1400. Next in step S131, the moving image file received from the PC 1400 is stored in the RAM 1102 or the HDD 1103 as the moving image data 201. The processing from step S112 onwards (same as processing of steps S2 to S11 in FIG. 2) is then executed to enable frames that included the designated character search string to be extracted from the designated moving image file.

The fifth and sixth embodiments may be implemented individually or appropriately combined. Further, the configuration of any of the second to fourth embodiments may be added to the configurations of the fifth and sixth embodiments.

Additional Embodiments

While embodiments of the present invention have been described in detail above, the present invention may also be applied to a system constituted by a plurality of devices, or an apparatus composed of a single device.

Note that the present invention can be achieved by directly or remotely supplying a software program that implements the functions of the foregoing embodiments to a system or apparatus, and using a computer in the system or apparatus to read and execute the supplied program code. In this case, provided the system or apparatus has the functions of the program, the mode of implementation need not be a program.

Consequently, since the functions of the present invention are implemented by a computer, the actual program code installed on the computer also implements the present invention. In other words, the claims of the present invention also cover the actual computer program for implementing the functions of the present invention. In this case, provided the system or apparatus has the functions of the program, the program may be executed in any form, such as object code, a program executed by an interpreter.

Examples of storage media that can be used for supplying the program include Floppy (Trademark) disk, hard disk, optical disk, magneto-optical disk, Magneto-optical disk, CD-ROM, CD-R, CD-RW, magnetic tape, nonvolatile memory card, ROM, and DVD (DVD-ROM, DVD-R).

Alternatively, the program can also be supplied by connecting to a website on the Internet using the browser of a client computer, and downloading the program from the website to a recording medium such as a hard disk. In this case, the actual program of the present invention or a compressed file including an auto-install function may be downloaded. Further, the program of the present invention can be supplied by dividing the program code constituting the program into a plurality of files and downloading the respective files from different websites. In other words, a World Wide Web (WWW) server that allows a plurality of users to download program files for implementing the functions of the present invention with a computer is also covered by the claims of the present invention.

The program of the present invention may also be distributed to users in encrypted form stored on a storage medium such as a CD-ROM. In this case, users that meet prescribed requirements are allowed to download decryption key information from a website via the Internet, and the program decrypted using this key-information is installed on a computer in an executable format.

The functions of the embodiments can be implemented in forms other than those described above, as a result of a computer executing the read program. For example, an operating system or the like running on a computer can perform part or all of the actual processing based on instructions in the program, with the functions of the foregoing embodiments being implemented as a result of this processing.

Further, the program read from the storage medium may also be written to a memory provided in a function expansion board inserted in a computer or a function expansion unit connected to a computer. In this case, a CPU or the like provided in the function expansion board or the function expansion unit then performs part or all of the actual processing based on instructions in the program, with the functions of the above embodiments being implemented as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-317768, filed Nov. 24, 2006, which is hereby incorporated by reference herein in its entirety.

What is claimed is:

1. An image retrieval apparatus for extracting a frame of moving image data as still image data, comprising:
    a character string input unit configured to input a character string;
    a reception unit configured to specify a time period based on a user designation;
    a search unit configured to retrieve frames having the character string input by the character string input unit from moving image data including a plurality of frames;
    a detecting unit configured to detect a position of the character string input by the character string input unit in a frame of the moving image data; and
    an image extraction unit configured to extract, when the same position is detected by the detecting unit in each of a predetermined number of frames retrieved by the search unit which are consecutively displayed within the time period specified by the reception unit, one of the predetermined number of frames as still image data.

2. The image retrieval apparatus according to claim 1, further comprising a moving image designation unit configured to designate moving image data to be searched.

3. The image retrieval apparatus according to claim 1, further comprising
    an area designation unit configured to designate a search area in frames included in the moving image data, wherein the search unit retrieves frames having the character string in the area designated by the area designation unit from the plurality of frames.

4. The image retrieval apparatus according to claim 1, further comprising
   a selection unit configured to select a frame to be extracted by the image extraction unit, from a predetermined number of frames retrieved by the search unit which are consecutively displayed within the time period specified by the reception unit, when the same position is detected by the detecting unit in each of the predetermined number of frames,
   wherein the image extraction unit extracts the frame selected by the selection unit.

5. The image retrieval apparatus according to claim 1, further comprising a print unit configured to print an image of the frame extracted by the image extraction unit.

6. An image retrieval method for extracting a frame of moving image data as still image data, comprising:
   a character string input step of inputting a character string;
   a reception step of specifying a time period based on a user designation;
   a search step of retrieving frames having the character string input in the character string input step from moving image data including a plurality of frames;
   a detecting step of detecting a position of the character string input in the character string input step in the frames retrieved in the search step; and
   an image extraction step of extracting, when the same position is detected in the detecting step in each of a predetermined number of frames retrieved in the search step which are consecutively displayed within the time period specified in the reception step, one of the predetermined number of frames as still image data.

7. The image retrieval method according to claim 6, further comprising a moving image designation step of designating moving image data to be searched.

8. The image retrieval method according to claim 6, further comprising
   an area designation step of designating a search area in frames included in the moving image data,
   wherein in the search step, frames having the character string in the area designated in the area designation step are retrieved from the plurality of frames.

9. The image retrieval method according to claim 6, further comprising
   a selection step of selecting a frame to be extracted in the image extraction step, from a predetermined number of frames retrieved in the search step which are consecutively displayed within the time period specified in the reception step, when the same position is detected in the detecting step in each of the predetermined number of frames,
   wherein in the image extraction step, the frame selected in the selection step is extracted.

10. The image retrieval method according to claim 6, further comprising a print step of printing an image of the frame extracted in the image extraction step.

11. A non-transitory computer readable storage medium storing a program, in executable form, which causes a computer to execute the method defined by claim 6.

* * * * *